(12) United States Patent
Wu et al.

(10) Patent No.: US 8,264,996 B2
(45) Date of Patent: *Sep. 11, 2012

(54) SIGNALLING CHANNEL AND RADIO SYSTEM FOR POWER SAVING IN WIRELESS DEVICES

(75) Inventors: Shiquan Wu, Nepean (CA); Wen Tong, Ottawa (CA); Claude Royer, Hull (CA); Edward Sich, Kanata (CA)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/684,540

(22) Filed: Jan. 8, 2010

(65) Prior Publication Data

US 2010/0110955 A1 May 6, 2010

Related U.S. Application Data

(63) Continuation of application No. 10/948,124, filed on Sep. 24, 2004, now Pat. No. 7,672,258.

(51) Int. Cl.
*G08C 17/00* (2006.01)
(52) U.S. Cl. .................................................. 370/311
(58) Field of Classification Search .................. None
See application file for complete search history.

(56) References Cited

U.S. PATENT DOCUMENTS

| 6,577,608 | B1 | 6/2003 | Moon et al. |
| 7,103,344 | B2 | 9/2006 | Menard |
| 7,133,704 | B2 * | 11/2006 | Twitchell, Jr. ............... 455/574 |
| 7,231,530 | B1 | 6/2007 | Miller et al. |
| 7,295,827 | B2 | 11/2007 | Liu et al. |
| 2002/0093920 | A1 | 7/2002 | Neufeld et al. |
| 2004/0235536 | A1 | 11/2004 | Kim et al. |
| 2005/0250452 | A1 | 11/2005 | Walton et al. |
| 2005/0277429 | A1 * | 12/2005 | Laroia et al. ................. 455/458 |
| 2006/0007898 | A1 * | 1/2006 | Maltsev et al. ............... 370/338 |

OTHER PUBLICATIONS

Office Action having a mailing date of Apr. 30, 2008, issued by the Patent Office during the prosecution of U.S. Appl. No. 10/948,124.
Office Action having a mailing date of Nov. 14, 2008, issued by the Patent Office during the prosecution of U.S. Appl. No. 10/948,124.
Advisory Action having a mailing date of Jan. 29, 2009, issued by the Patent Office during the prosecution of U.S. Appl. No. 10/948,124.
Office Action having a mailing date of Apr. 22, 2009, issued by the Patent Office during the prosecution of U.S. Appl. No. 10/948,124.
Notice of Allowance mailed Oct. 8, 2009, issued by the Patent Office during the prosecution of U.S. Appl. No. 10/948,124.

* cited by examiner

*Primary Examiner* — Anh-Vu Ly
(74) *Attorney, Agent, or Firm* — Withrow & Terranova, PLLC

(57) ABSTRACT

Wireless devices, transmitters, systems and methods are provided that have a narrow band signalling channel and a wide band channel, for example an OFDM channel. In order to save power, the wireless device is nominally powered down with the exception of a receiver specific to the narrow band signalling channel. Once instructed to do so over the narrow band signalling channel, the wireless device wakes up the rest of its wide band receive circuitry.

11 Claims, 6 Drawing Sheets

SIGNALLING CHANNEL AND RADIO SYSTEM FOR POWER SAVING IN WIRELESS DEVICES

This application is a continuation of U.S. patent application Ser. No. 10/948,124 and claims the benefit thereof.

FIELD OF THE INVENTION

The invention relates to systems and methods for communicating with wireless terminals in a manner that is efficient in terms of power consumption.

BACKGROUND OF THE INVENTION

Power supply management is a significant challenge in terminal and smart sensor design. This is because such terminals and sensors typically have a limited battery capacity. Anything that can be done to reduce power consumption for such wireless terminals and sensors would be of benefit.

Traditional terminal/receiver designs drain a large amount of power even if the terminal is in an idle or dormant mode. The reason for this is that the terminals are required to monitor a paging channel or a beacon channel all the time.

OFDM (orthogonal frequency division multiplexing) terminals typically drain even more power than CDMA/TDMA (code division multiple access/time division multiple access) terminals due to the fact that such terminals run their wide band and high resolution ADC (analog-to-digital converter) and FFT (Fast Fourier Transform)/sub-FFT engines all the time, or at least during any period that detection of any signals is to be possible.

For example, an OFDM terminal in sleep mode will typically periodically wake up to see if it has any messages. However, conventional terminals must perform processing on the full OFDM bandwidth to see if there are any messages. This takes a significant amount of power because a full analog-to-digital conversion on the entire bandwidth of the OFDM system must be performed together with the processing of the whole digitized data block in terms of data buffering, framing, full FFT computation etc. Typically, the paging channel is transmitted at a particular time and frequency with the same processing engine as the main task channels and the terminal must wake up in order to look at the paging channel.

It is also noted that due to the high peak-to-average power ratio, the ADC needs to cover a high dynamic range, and this also increases the power consumption.

SUMMARY OF THE INVENTION

According to one broad aspect, the invention provides a wireless device comprising: a wide band receiver adapted to receive a wide band signal; and a narrow band receiver adapted to receive a narrow band signal, and to process the narrow band signal to determine whether or not to wake up the wide band receiver, and to wake up the wide band receiver if so determined.

In some embodiments, the narrow band receiver is a passive device.

In some embodiments, the narrow band receiver is a semi-passive device.

In some embodiments, the wide band receiver is an OFDM receiver.

In some embodiments, the wide band signal comprises an OFDM signal with zeros inserted at sub-carrier location(s) where the narrow band signal is to reside.

In some embodiments, the wireless device comprises a power supply and a switch connecting the power supply to the wide band receiver under control of the narrow band receiver, wherein waking up the wide band receiver comprises controlling the switch to supply power to the wide band receiver.

In some embodiments, processing the narrow band signal to determine whether or not to wake up the wide band receiver comprises demodulating and decoding the narrow band signal and checking if the narrow band signal has a message for this wireless device or not.

In some embodiments, the wide band receiver is a CDMA receiver and the wide band signal is a CDMA signal.

In some embodiments, the signalling channel occupies a spectrum adjacent to a spectrum of the CDMA signal.

In some embodiments, the narrow band receiver wakes itself up on a periodic basis.

According to another broad aspect, the invention provides a transmitter adapted to generate a signal containing a wide band signal and a narrow band signal, wherein the narrow band signal contains information instructing particular wireless devices to wake up to receive the wide band signal.

In some embodiments, the transmitter comprises: a first IFFT function having a plurality of data inputs, and at least one zero input in a frequency location(s) where the narrow band signal is to reside; a second IFFT having zero inputs at frequency locations corresponding to the plurality of data inputs, and at least one signalling channel input in the frequency location(s) where the narrow band signal is to reside.

In some embodiments, the transmitter comprises: an IFFT function having a plurality of data inputs, and at least one zero input in a frequency location(s) where the narrow band signal is to reside; a narrow band modulator for generating the narrow band signal operating at a signalling channel frequency where the zeros were inserted.

In some embodiments, the transmitter comprises: an IFFT function having a plurality of data inputs; a narrow band modulator for generating the narrow band signal operating at a signalling channel frequency out of an operating bandwidth of the wide band signal.

In some embodiments, the transmitter comprises: an IFFT function having a plurality of data inputs, and at least one zero input in a frequency location(s) where the narrow band signal is to reside; a narrow band modulator for generating the narrow band signal operating at multiple frequencies.

In some embodiments, the transmitter comprises: an IFFT function having a plurality of data inputs, and at least signalling channel input in a frequency location(s) where the narrow band signal is to reside.

In some embodiments, the transmitter comprises: a main CDMA signal generator operating in a CDMA bandwidth for generating a main CDMA signal; a signal channel generator operating at an edge of the CDMA bandwidth for generating the narrow band signalling channel.

In some embodiments, the transmitter comprises: a main CDMA signal generator operating in a CDMA bandwidth for generating a main CDMA signal; a signal channel generator operating outside the CDMA bandwidth for generating the narrow band signalling channel.

According to another broad aspect, the invention provides a method comprising: communicating a wide band signal; and communicating a narrow band signal, the narrow band signal indicating whether or not to wake up a wide band receiver.

In some embodiments, the communicating the wide band signal and the narrow band signal comprise transmitting these signals.

In some embodiments, the communicating the wide band signal and the narrow band signal comprises receiving these signals.

In some embodiments, the wide band signal is OFDM signal with zeros inserted at sub-carrier location(s) where the narrow band signal is to reside.

In some embodiments, the method further comprises: examining the narrow band signal to determine whether or not to wake up the wide band receiver; waking up the wide band receiver if so determined.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

In order to reduce the power consumption of a wireless device due to the processing of the received paging channel or similar channels, a new signalling channel is provided for use in OFDM systems. The bandwidth of one or more tones or pieces of spectrum are pre-assigned at a certain frequency or frequencies. One of the tones or one piece of spectrum or their combinations is used for signalling. The new signalling channel might contain beacon channel information or paging channel information or system information to name a few examples. The total bandwidth of this particular channel can be selected depending upon the designated network capacity. In some embodiments, this channel information is modulated in the time domain, for example as a PSK (phase shift keying) signal or as an AM signal or otherwise. In another embodiment, the channel information is modulated in the frequency domain similar to OFDM. In some embodiments, the signalling channel is encoded and modulated separately from the remaining of the OFDM transmission and therefore the paging channel can be implemented as a separate module to hook up to a primary radio responsible for the generation of the full OFDM signal, and preferably with constant modulation. The OFDM sub-carriers are zeroed out if the signalling channel is designed within band. In other embodiments, the signalling channel can be implemented together with the OFDM transmitter. The portion of the transmitter responsible for generation of the full transmit signal will be referred to as the primary transmitter.

Figure 1:
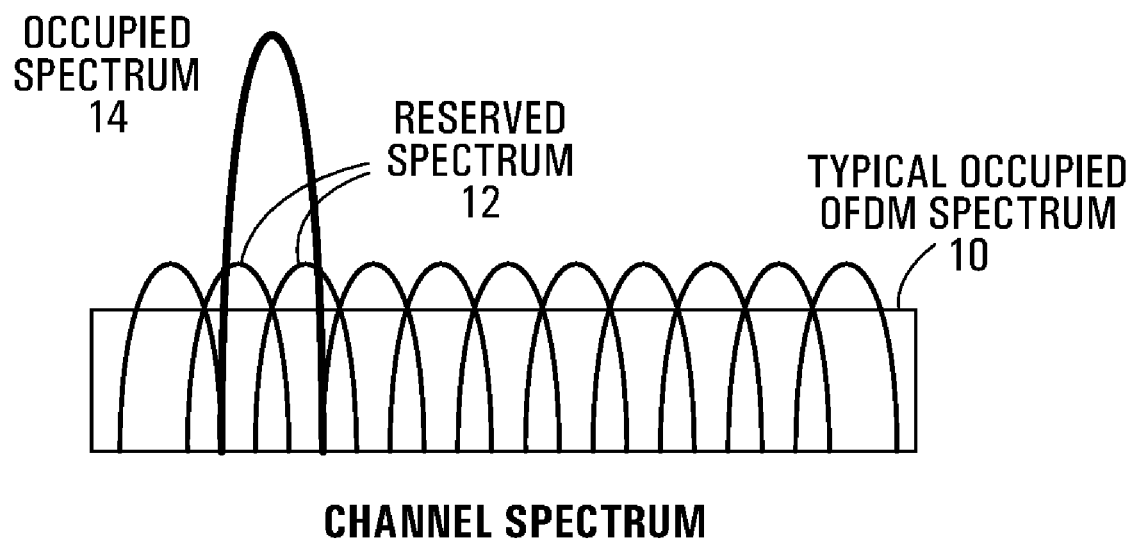
FIG. 1 is a frequency plan of an example implementation of a downlink signalling channel provided by an embodiment of the invention.

Referring now to FIG. 1, shown is an example of the downlink signalling channel. Generally indicated at 10 is the typical occupied OFDM spectrum. It can be seen that this consists of a contiguous set of sub-carriers. The number of sub-carriers will vary for different applications. According to an embodiment of the invention, a portion of the spectrum is reserved, referred to as the reserved spectrum 12. The reserved subcarriers can be anywhere inside the spectrum 10. Within this spectrum, there is transmitted a signal which occupies an occupied signalling channel spectrum as indicated at 14. The occupied signalling channel spectrum is designed so as to fall completely within the reserved spectrum 12.

Preferably, the signalling channel bandwidth is an integer multiple of the sub-carrier bandwidth.

Figure 2A:
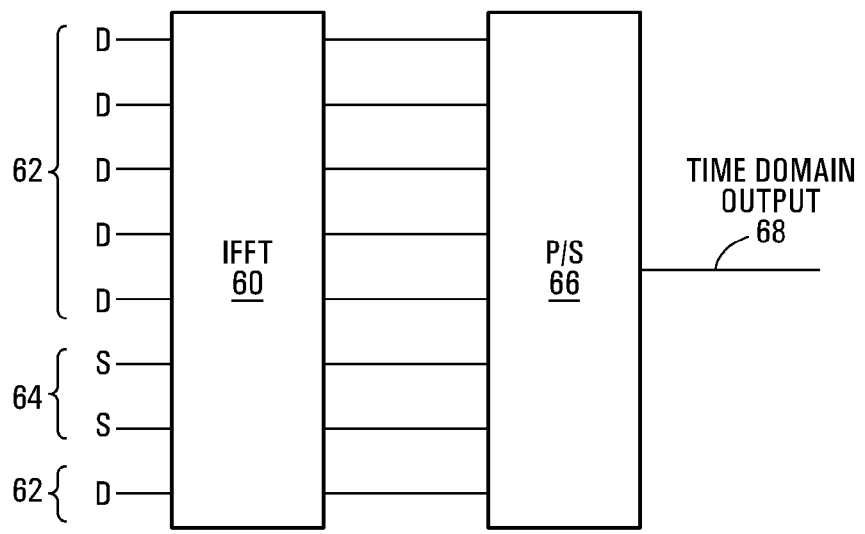
FIG. 2A is a block diagram of a transmitter adapted to generate both a wide band OFDM signal and narrow band signalling channel according to an embodiment of the invention.

Referring now to FIG. 2A, shown is a block diagram of a first example of an OFDM transmitter capable of generating a narrow band signalling channel in accordance with an embodiment of the invention. The signalling channel in this example is implemented in the frequency domain by the primary transmitter. Shown is an IFFT function 60 having eight inputs consisting of six data inputs 62 and two signalling channel inputs 64. The IFFT produces a time domain output which is input to a parallel-to-serial converter 66 to produce an overall output 68. In this case, a single IFFT 60 is employed to produce the overall output containing both the wide band content and the signalling channel content. In this example and the examples that follow, it is to be understood that the number of sub-carriers and the particular location of the sub-carriers for data and signalling are particular to these examples, but that more generally any number of sub-carriers can be employed for a wide band content, and the narrow band signalling channel can be inserted anywhere within the wide band spectrum. Preferably however, the signalling channel is inserted at the edge of the available spectrum, and occupies as few sub-carriers as possible to control the system overhead.

Figure 2B:
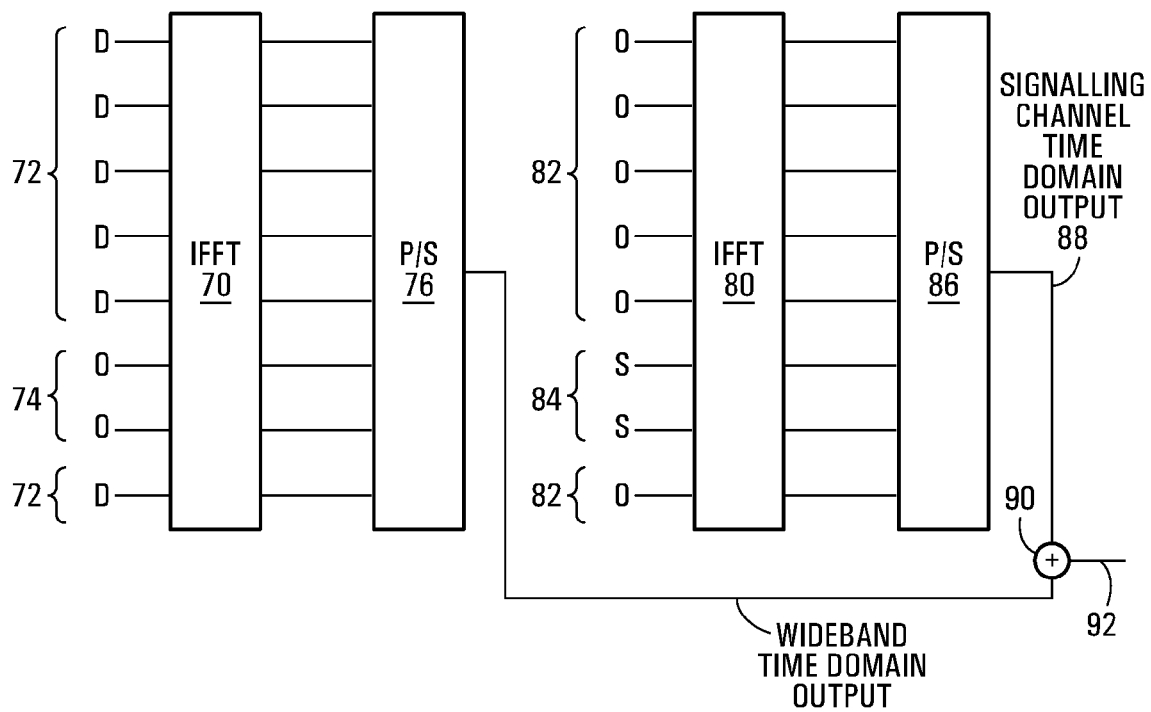
FIG. 2B is a block diagram of a transmitter adapted to generate both a wide band OFDM signal and narrow band signalling channel according to an embodiment of the invention.

Referring to FIG. 2B, shown is another example of a transmitter adapted to produce a signal containing both the wide band output and the signalling channel. In this case, the signalling channel is implemented in the frequency domain separately from the primary transmitter. Shown is a first IFFT function 70 receiving as input data inputs 72, and zero inputs 74 in the frequency locations where the signalling channel is to reside. The output of IFFT 70 is converted to serial form with parallel-to-serial converter 76 to produce a wide band time domain output 78. Similarly, a second IFFT function 80 is shown having zero inputs 82 where the wide band data content is to be located, and having signalling channel inputs 84 at the frequency locations where the signalling channel is to reside. The IFFT 80 produces a time domain output which is converted to serial form with parallel-to-serial converter 86 to produce a signalling channel time domain output 88. The two time domain outputs 78,88 are combined at 90 to produce an overall output 92.

Figure 2C:
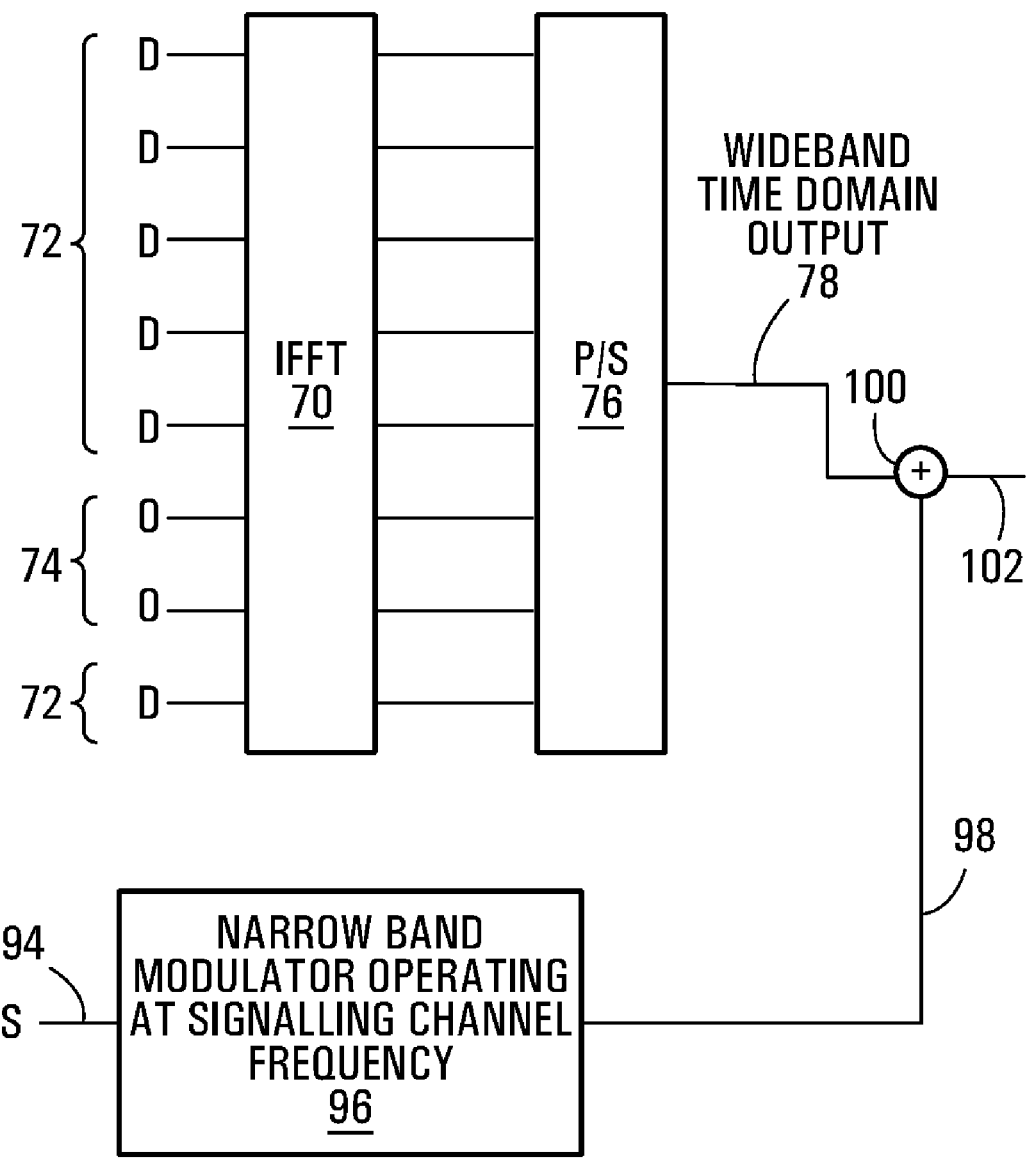
FIG. 2C is a block diagram of a transmitter adapted to generate both a wide band OFDM signal and narrow band signalling channel according to an embodiment of the invention.

A third example of a transmitter for generating an overall output containing the OFDM signal and narrow band signalling channel is shown in FIG. 2C. In this example, the signalling channel is separately designed within the reserved spectrum and may or may not involve IFFT functionality. In this case the OFDM functionality for the wide band signal is the same as that of FIG. 2B, and a wide band time domain output is produced at 78. Also shown is a narrow band modulator 96 operating at signalling channel frequency. This takes signalling channel information 94, modulates it at the signalling channel frequency to produce the signalling channel output 98 which is combined at 100 with the wide band time domain output 78 to produce an overall output 102.

Figure 2D:
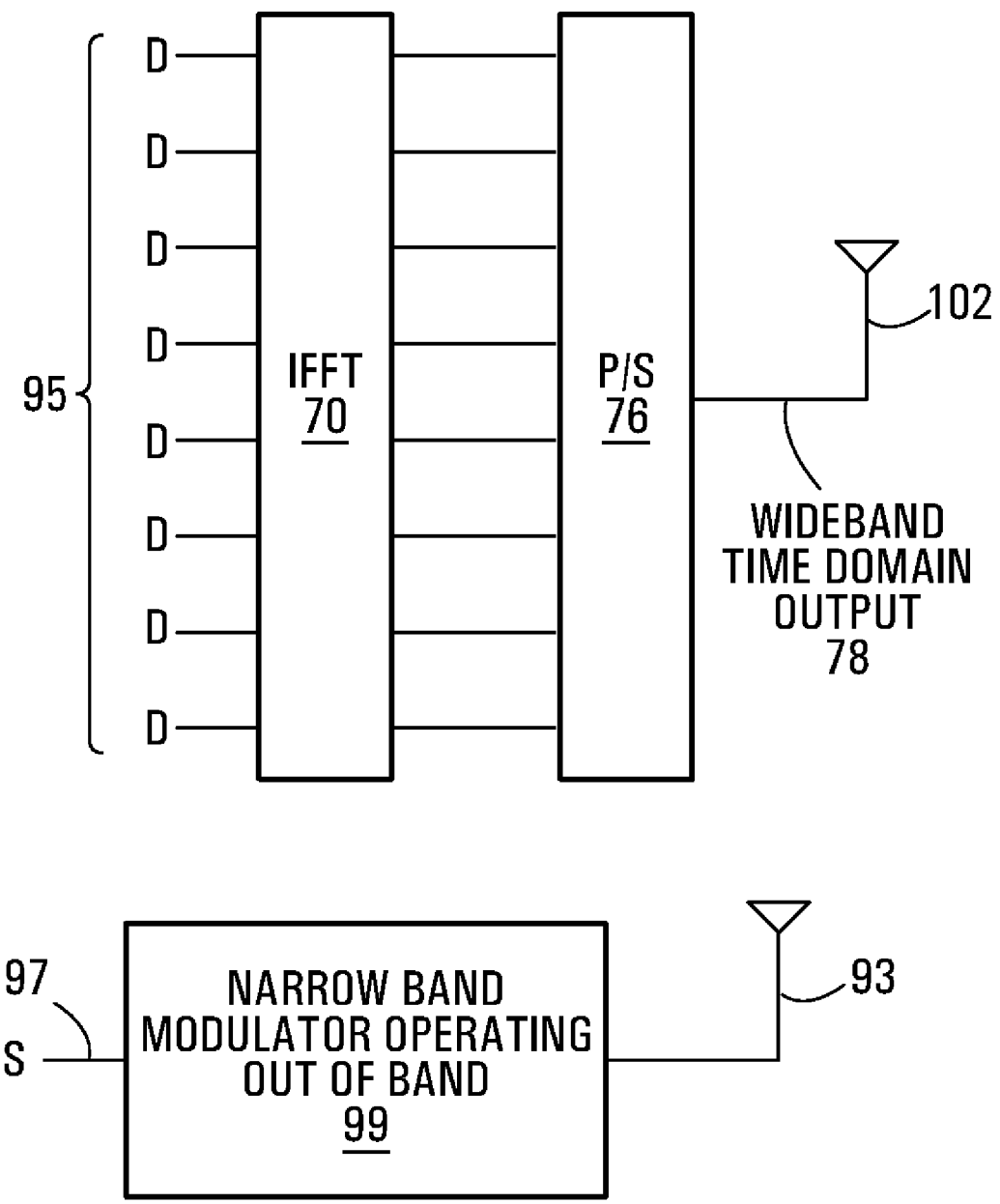
FIG. 2D is a block diagram of a transmitter adapted to generate both a wide band OFDM signal and narrow band signalling channel which has center frequency at a certain frequency that may not necessarily be located inside the OFDM spectrum according to an embodiment of the invention.

A fourth example of a transmitter for generating an overall output containing the OFDM signal and narrow band signalling channel is shown in FIG. 2D. In this case, the OFDM functionality for the wide band signal is the same as that of FIG. 2B, and a wide band time domain output is produced from data inputs 95 at 78. Also shown is a narrow band modulator 99 operating at a certain signalling channel frequency. This takes signalling channel information 97, modulates it at the signalling channel frequency to produce the signalling channel output 93 which is separately transmitted and of course time synchronized with the primary transmitter. Depending on the frequency location of the narrow band channel, it may or may not be necessary to insert zeros for one or more sub-carriers of the OFDM signal. This signalling channel may or may not share hardware such as RF front end, antenna, etc. with the rest of the transmitter.

Four very specific examples of OFDM modulation have been shown in FIGS. 2A, 2B, 2C and 2D. Of course a transmitter would typically include far more functions than those shown in these figures. The minimum details necessary to illustrate how the signalling channel can be modulated have been included. Also, it is to be understood that the IFFT is but one example of a function for generating an OFDM signal.

Figure 3:
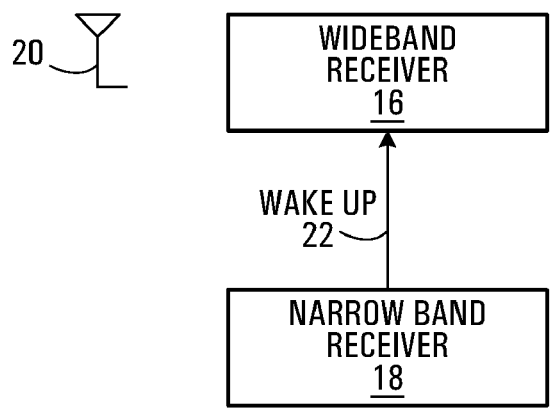
FIG. 3 is a block diagram of a wireless device adapted to receive a narrow band signalling channel in accordance with an embodiment of the invention.

Referring now to FIG. 3, shown is a block diagram of a wireless device provided by an embodiment of the invention. The terminal features a wide band receiver 16 and a narrow band receiver 18. Also shown is antenna functionality generally indicated by 20. The antenna functionality may consist of a single or multiple antennas connected to both of the receiver 16 and 18, or may consist of respective antennas connected to each of the receivers 16 and 18. The narrow band receiver 18 operates to receive a narrow band signalling channel, and to decide on the basis of the narrow band signalling channel whether or not to generate a wake up signal 22 to wake up the wide band receiver 16. This wake up signal can come in any appropriate form. For example it might simply be a signal to switch on a power supply driving the wide band receiver 16. The signal may contain scheduling information. Once the wide band receiver is on, it will stay on until it is deemed acceptable to power down again. This may occur for example after the completion of a transmission of a data package after which the wireless device will power down and wait for another wake-up.

Figure 4:
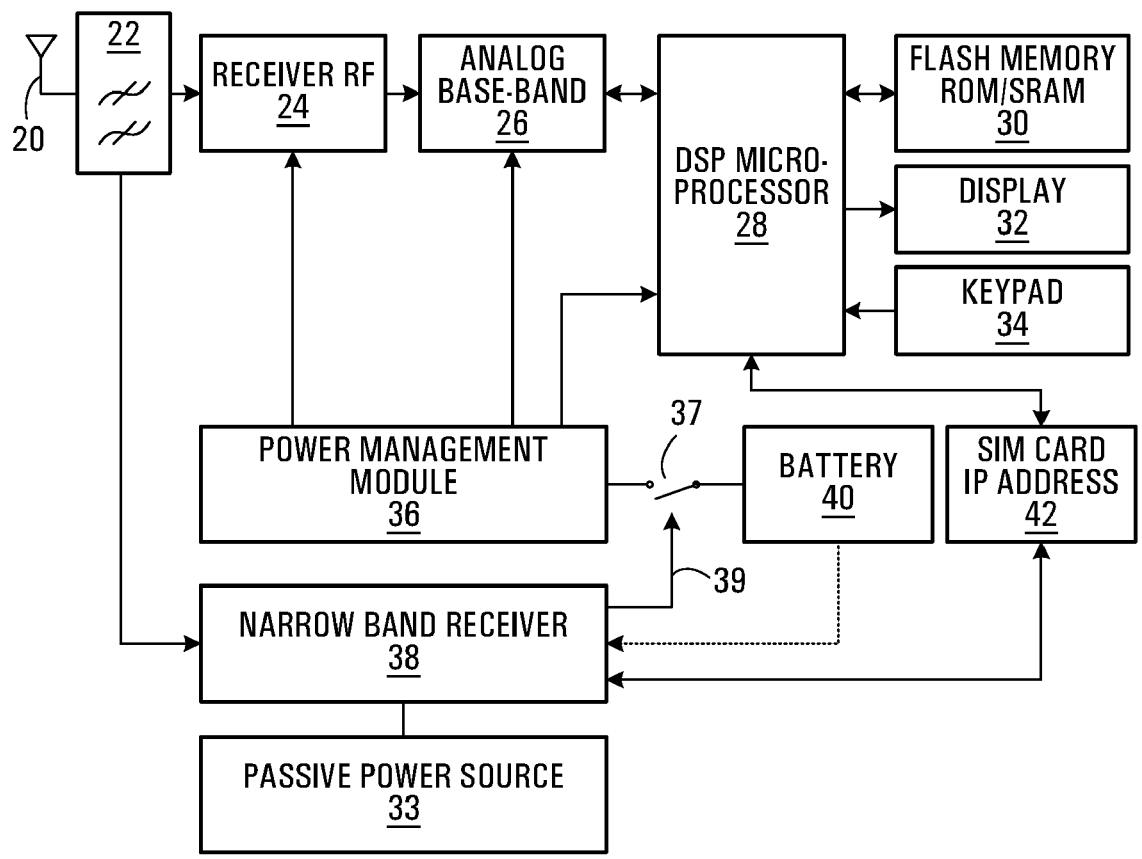
FIG. 4 is a block diagram of another wireless device adapted to receive a narrow band signalling channel in accordance with an embodiment of the invention.

Referring now to FIG. 4, shown is a block diagram of an example wireless device adapted to process both the regular OFDM channel and the signalling channel, as provided by an embodiment of the invention. Shown are only some of the key conventional components of an OFDM receiver for illustration purposes, these consisting of a receive antenna 20, receive duplexer filter 22, RF receiver 24, analog base-band processor 26. There is a power management module 36 connected to both the RF receiver 24 and the analog base-band processor 26. The analog base-band processor 26 and the power management module 36 are also both connected to a DSP (digital signal processor) microprocessor 28. The DSP microprocessor 28 is connected to memory 30 which might be flash memory, ROM or SRAM to name a few examples. It is also connected to a display 32 and keypad 34. Finally, there is shown a SIM card 42 having an IP address. The components described thus far all form part of an example of a conventional OFDM receiver. More generally, any set of functionality that is capable of performing normal reception of OFDM signals is contemplated in place of the above described functionality.

In addition to the conventional receiver, there is a narrow band receiver 38 also shown connected to the antenna 20 via filter 22. The narrow band receiver is connected to a module where a subscriber identifier, network information, etc. are stored, for example a SIM card.

Also shown is a battery 40. Battery 40 is connectable to the power management module or not 36 by power switch 37 depending on instructions from the narrow band receiver 38.

The arrow 39 from narrow band receiver 38 to power switch 37 represents an instruction arrow rather than wiring connection. The dotted arrow from battery 40 to narrowband receiver 38 is an optional real connection from which the narrowband receiver may drain power for housekeeping purposes and internal clock purposes etc. The narrow band receiver may alternatively have its own battery for housekeeping that is separate from the main battery. The narrow band receiver 38 is designed to only look at the signalling channel. This can be done in a much more power efficient manner than would be the case in receiving a paging channel using all of the conventional receiver circuitry.

In some embodiments, the narrow band receiver 38 is on constantly and is capable of receiving a message at any time. In another embodiment, the narrow band receiver 38 wakes itself up on a periodic/scheduled basis. This may for example be achieved by running an internal clock parasite on the primary radio clock such that after system sychronization, the narrow band receiver knows when and where the paging channel appears. This latter approach is more power efficient. Once the narrow band receiver 38 receives a message for the particular terminal, it will then wake up the remainder of the wireless device by switching power switch 37 over to the power management module 36 such that the terminal is then operating in a conventional manner over the entire OFDM spectrum.

In some embodiments, the narrow band receiver 38 does not operate when the remainder of the wireless devices are operating in wide band receiving mode. In another embodiment, the narrow band receiver 38 continues to receive power and to operate even while the remainder of the wireless device is powered on.

Not shown in FIG. 4 is all of the circuitry involved for wide-band transmission. In duplex implementations, such circuitry would be included. However, for the signalling channel, there is only receive functionality.

In some embodiments, this new narrow band channel is a replacement for an existing paging channel within the wideband spectrum. Alternatively, the new signalling channel is used as described, but the existing channel can also be used to communicate to terminals that are fully powered. In some embodiments, the narrow band receiver is completely passive, and does not require any power supply whatsoever. Examples of receivers that would be capable of functioning in this manner are MEMS resonators, MEMS RF receivers, or circuits that are capable of collecting RF energy from transmitters via inductive coupling circuitry. All the receiver needs to be able to do is to receive and process enough of the signal to identify if there is a message for the particular wireless device.

In other embodiments, the narrow band receiver is semi-passive, having a small power supply for house keeping purposes or obtaining a small amount of power from the main power supply. In such an embodiment, power is supplied from the battery for house keeping purposes. However, there is still passive circuitry for collecting RF energy that is then used to process the paging channel and to turn on/off the power for the main radio. FIG. 4 shows a passive power source 33 that might be used in passive or semi-passive implementations.

Figure 5:
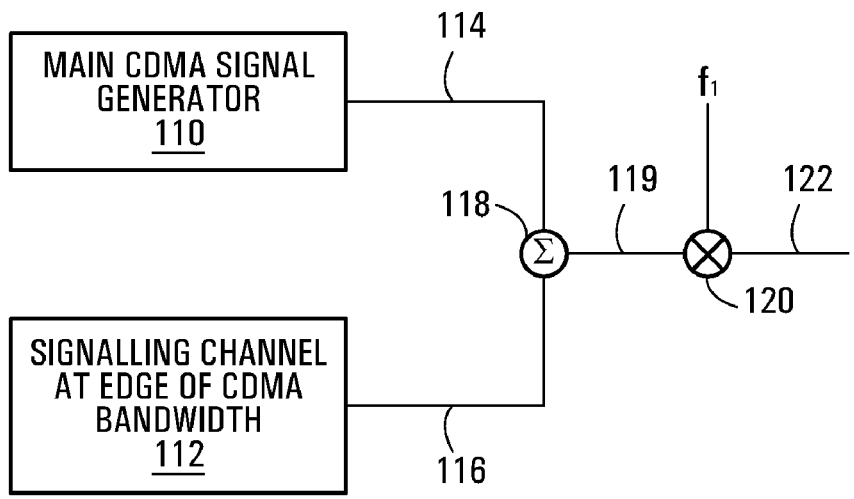
FIG. 5 is a block diagram of a CDMA transmitter that is adapted to generate a narrow band signalling channel in accordance with an embodiment of the invention.

Referring now to FIG. 5, shown is a block diagram of another transmitter in accordance with an embodiment of the invention. This embodiment is particular to CDMA signals. Shown is a main CDMA signal generator 110 that generates a wide band CDMA signal 114. Also shown is a signalling channel generator operating at the edge of the CDMA bandwidth 112 that produces a signalling channel output 116. This is combined with the wide band signal 114 at 118, and the sum 119 is up converted at 120 to produce an overall output 122. The corresponding receiver is similar to that of FIG. 3 or 4, but with the wide band receiver being a CDMA receiver.

Figure 6:
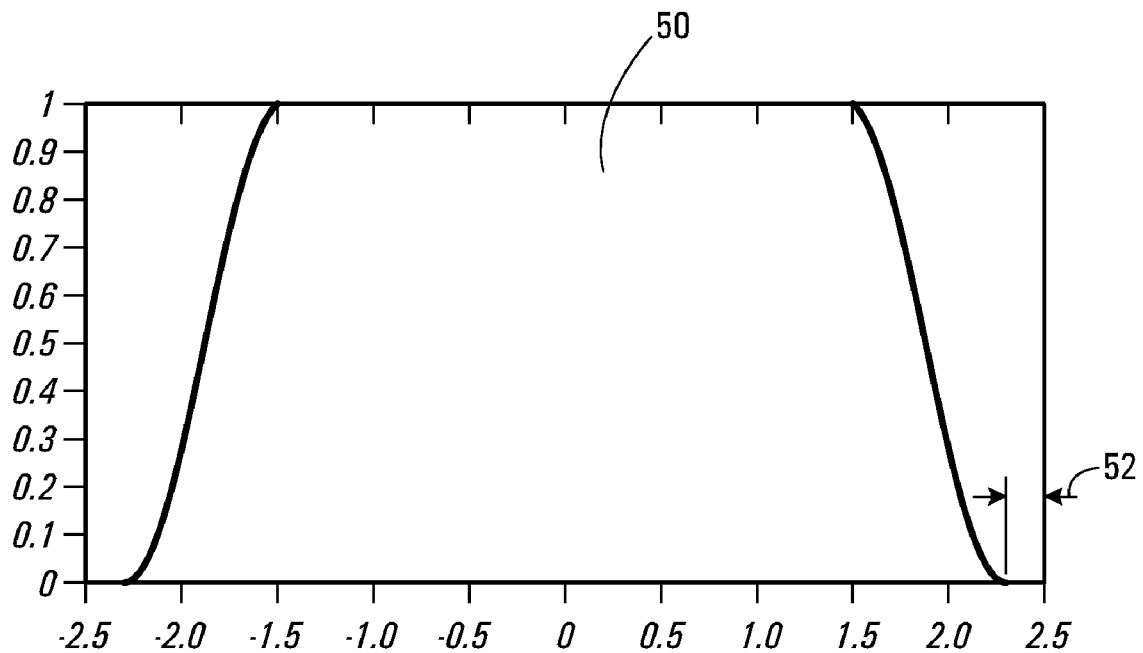
FIG. 6 is an example of spectrum utilization for a UMTS wireless device adapted to receive a narrow band signalling channel in accordance with an embodiment of the invention.

FIG. 6 shows an example of spectrum utilization for the embodiment of FIG. 5 specific to a 3GPP/UMTS wireless device. Such wireless devices employ signals occupying a 5 MHz bandwidth. The original chip rate for this standard was 4.096 MCPS (mega chips per second). However, due to a change in the standard now the chip rate is 3.84 MCPS. This results in an amount of extra bandwidth equal to 4.096−3.84=256 kHz. This is enough for two narrow band channels with a 128 kHz bandwidth each. This is shown in FIG. 6 where the UMTS signal bandwidth is generally indicated at 50, and the leftover bandwidth at 52 is now used for narrow band signalling channels as described above.

Numerous modifications and variations of the present invention are possible in light of the above teachings. It is therefore to be understood that within the scope of the appended claims, the invention may be practiced otherwise than as specifically described herein.

We claim:

1. A transmitter configured to generate a signal containing a wide band signal and a narrow band signal, wherein the narrow band signal contains information instructing particular wireless devices to wake up to receive the wide band signal, the transmitter comprising:
an IFFT function having a plurality of data inputs for generating the wide band signal;
a narrow band modulator for generating the narrow band signal operating at a signalling channel frequency out of an operating bandwidth of the wide band signal.

2. A transmitter configured to generate a signal containing a wide band signal and a narrow band signal, wherein the narrow band signal contains information instructing particular wireless devices to wake up to receive the wide band signal, the transmitter comprising:
an IFFT function having a plurality of data inputs for generating the wide band signal, and at least one zero input in a frequency location(s) where the narrow band signal is to reside;
a narrow band modulator for generating the narrow band signal operating at multiple frequencies.

3. The transmitter of claim 2 wherein:
the narrow band modulator outputs at least signalling channel output in a frequency location(s) where the narrow band signal is to reside.

4. A transmitter configured to generate a signal containing a wide band signal and a narrow band signal, wherein the narrow band signal contains information instructing particular wireless devices to wake up to receive the wide band signal, the transmitter comprising:
a main CDMA signal generator operating in a CDMA bandwidth for generating a main CDMA signal that is the wideband signal;
a signal channel generator operating at one of:
an edge of the CDMA bandwidth for generating a narrow band signalling channel that includes the narrow band signal; or
outside the CDMA bandwidth for generating a narrow band signaling channel that includes the narrow band signal.

5. A method comprising:
generating a wide band CDMA signal;
generating a narrow band signal outside a CDMA bandwidth of the wide band CDMA signal, the narrow band signal indicating whether or not to wake up a wide band receiver; and
communicating the wide band CDMA signal and the narrow band signal.

6. The method of claim 5 wherein communicating the wide band CDMA signal and the narrow band signal comprises transmitting these signals.

7. The method of claim 5 wherein communicating the wide band CDMA signal and the narrow band signal comprises receiving these signals.

8. The method of claim 7 further comprising:
determining whether or not to wake up the wide band receiver based on the narrow band signal; and
waking up the wide band receiver if so determined.

9. The method of claim 5, wherein the wide band CDMA signal and the narrow band signal are combined prior to communication.

10. A method comprising:
generating a wide band CDMA signal;
generating a narrow band signal at an edge of a CDMA bandwidth of the wide band CDMA signal, the narrow band signal indicating whether or not to wake up a wide band receiver; and
transmitting the wide band CDMA signal and the narrow-band signal.

11. The method of claim 10, wherein the wide band signal and the narrow band signal are combined prior to transmission.

* * * * *